United States Patent
Sonoda et al.

(10) Patent No.: US 9,356,462 B2
(45) Date of Patent: May 31, 2016

(54) BATTERY CHARGING APPARATUS

(71) Applicants: HONDA MOTOR CO., LTD., Tokyo (JP); SHINDENGEN ELECTRIC MANUFACTURING CO., LTD., Tokyo (JP)

(72) Inventors: Yutaka Sonoda, Wako (JP); Katsuhiro Ouchi, Wako (JP); Kazuhiko Ono, Wako (JP); Takeaki Sugimoto, Hanno (JP); Yuta Inoguchi, Hanno (JP)

(73) Assignees: HONDA MOTOR CO., LTD., Tokyo (JP); SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 338 days.

(21) Appl. No.: 13/792,563

(22) Filed: Mar. 11, 2013

(65) Prior Publication Data

US 2013/0257353 A1    Oct. 3, 2013

(30) Foreign Application Priority Data

Mar. 30, 2012  (JP) .................................. 2012-081910

(51) Int. Cl.
*H02J 7/00* (2006.01)
*H02M 7/217* (2006.01)
*H02J 7/14* (2006.01)

(52) U.S. Cl.
CPC ............... *H02J 7/007* (2013.01); *H02J 7/1484* (2013.01); *H02M 7/2173* (2013.01)

(58) Field of Classification Search
CPC .................................. H02J 7/007; H02H 7/06
USPC ............................................ 320/107; 322/29
See application file for complete search history.

(56) References Cited

U.S. PATENT DOCUMENTS

| | | | | |
|---|---|---|---|---|
| 4,613,808 A * | 9/1986 | Edwards | ........................ | 322/99 |
| 5,491,624 A * | 2/1996 | Levran et al. | ................... | 363/87 |
| 5,512,811 A * | 4/1996 | Latos et al. | ..................... | 322/10 |
| 5,753,989 A * | 5/1998 | Syverson et al. | ............. | 310/114 |
| 5,982,645 A * | 11/1999 | Levran et al. | ................... | 363/37 |
| 6,420,855 B2 * | 7/2002 | Taniguchi et al. | .............. | 322/28 |
| 7,253,590 B2 | 8/2007 | Suzuki et al. | | |
| 2005/0093520 A1 * | 5/2005 | Muramatsu | ....... | H02M 7/53871 322/29 |
| 2006/0249957 A1 * | 11/2006 | Ito et al. | ........................ | 290/44 |
| 2011/0029179 A1 * | 2/2011 | Miyazaki | ................. | B60K 6/46 701/22 |
| 2013/0257353 A1 * | 10/2013 | Sonoda | .................. | H02J 7/007 320/107 |

FOREIGN PATENT DOCUMENTS

JP        2006-136122 A       5/2006

* cited by examiner

*Primary Examiner* — Richard Isla Rodas
*Assistant Examiner* — Dung V Bui
(74) *Attorney, Agent, or Firm* — Squire Patton Boggs (US) LLP

(57) ABSTRACT

A battery charging apparatus includes a plurality of input terminals which are connected to respective phases of a three-phase AC dynamo, and a rectifying circuit including a plurality of rectifying elements and a plurality of switching elements. A switching element control unit and pulse generation unit are provided, for controlling the turning on/off of the switching elements, and for generating a pulse signal, respectively. The switching element control unit is configured to control the plurality of switching elements, and includes a potential difference detection unit configured to detect potential differences between potentials of input terminals, and a specifying unit configured to determine a phase order of AC outputs which are input to the input terminals.

15 Claims, 10 Drawing Sheets

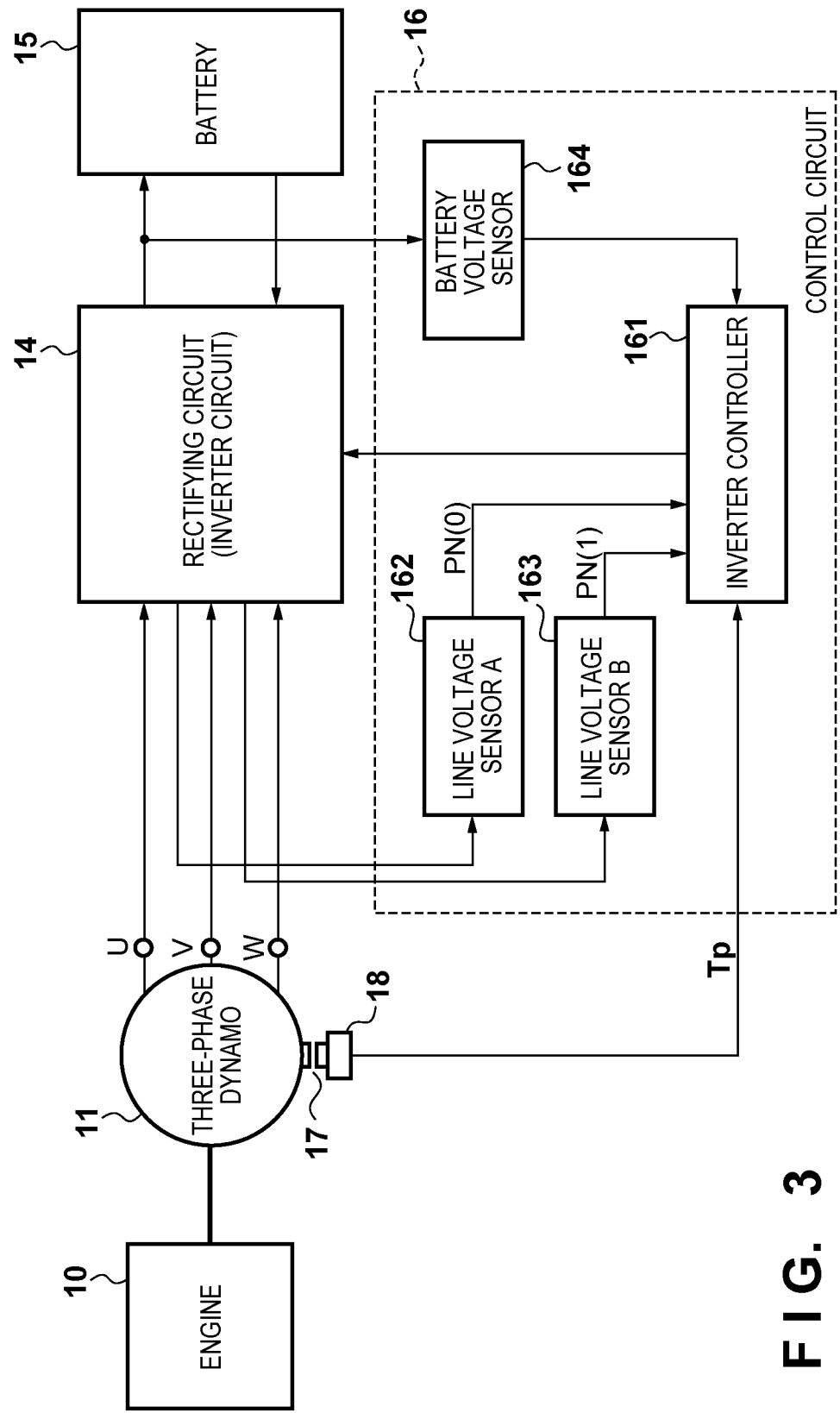
F I G. 3

BATTERY CHARGING APPARATUS

BACKGROUND

1. Field

The present invention relates to a charging apparatus for charging a battery for a vehicle.

2. Description of Related Art

Japanese Patent Laid-Open No. 2006-136122 discloses a technique in which switching elements that supply control voltages to armature coils of a dynamo are added to a rectifying circuit to control the control voltages, so as to increase or decrease output voltages of the dynamo. Upon execution of this control, switching elements which control phases of voltages to be supplied to armature coils for three phases of the dynamo are required, and correspondence between the switching elements and three phases to be controlled has to be specified. A correct connection between the switching element and corresponding armature coil is required not only at the time of manufacture of a vehicle but also at the time of re-assembly after the dynamo and rectifying circuit are disconnected upon maintenance of the vehicle. If the correct connection is not attained at the time of manufacture or re-assembly, a normal operation as a battery charging apparatus cannot be obtained.

For this reason, for example, an input terminal of the rectifying circuit and a corresponding output terminal of the dynamo are colored in the same color to clarify distinctions of the terminals in advance, so that each switching element is correctly connected to the corresponding armature coil. However, distinctions by coloring of the terminals increase cost of the dynamo and rectifying circuit accordingly.

SUMMARY

Certain embodiments of the present invention can specify phases of three-phase AC outputs connected to a plurality of input terminals of a battery charging apparatus.

In certain embodiments, the present invention provides a battery charging apparatus, which is connected between a three-phase AC dynamo and a battery. The apparatus can include a plurality of input terminals which are respectively connected to output terminals of respective phases of the three-phase AC. A rectifying circuit can be composed of a plurality of rectifying elements and a plurality of switching elements. A switching element control unit is configured to control turning on and off of the respective switching elements of the rectifying circuit. A pulse generation unit is configured to generate a pulse signal by detecting passage of a reluctor arranged on a rotor of the three-phase AC generator. The switching element control unit is also configured to control the plurality of switching elements to set output voltages to the battery in a full-wave rectification state or an all-phase short-circuited state. The switching element control unit can include a potential difference detection unit configured to detect potential differences between potentials of at least two input terminals of the plurality of input terminals and a ground potential of the battery, and a specifying unit configured to determine a phase order of three-phase AC outputs input to the input terminals based on a pattern of the potential differences detected by the potential difference detection unit, and specifying phases of the three-phase AC outputs input to the plurality of input terminals based on a relationship among the phase order, a generation timing of the pulse signal, and the potential differences of the plurality of input terminals.

According to embodiments of the present invention, phases of three-phase AC outputs connected to a plurality of input terminals of a battery charging apparatus can be specified. As a result, even when output terminals of a three-phase AC dynamo are arbitrarily connected to input terminals of the battery charging apparatus, control voltages can be appropriately supplied to armature coils, and output voltages of the three-phase AC dynamo can be controlled so as to obtain an appropriate voltage as charging voltages. As a result, distinctions of terminals by coloring or the like are not required, and attachment/detachment operations of the three-phase AC dynamo and battery charging apparatus at the time of manufacture or maintenance of a vehicle are facilitated.

BRIEF DESCRIPTION OF DRAWINGS

FIG. 3 is a block diagram which shows an arrangement example of the battery charging apparatus of an embodiment.

DETAILED DESCRIPTION

Figure 1:
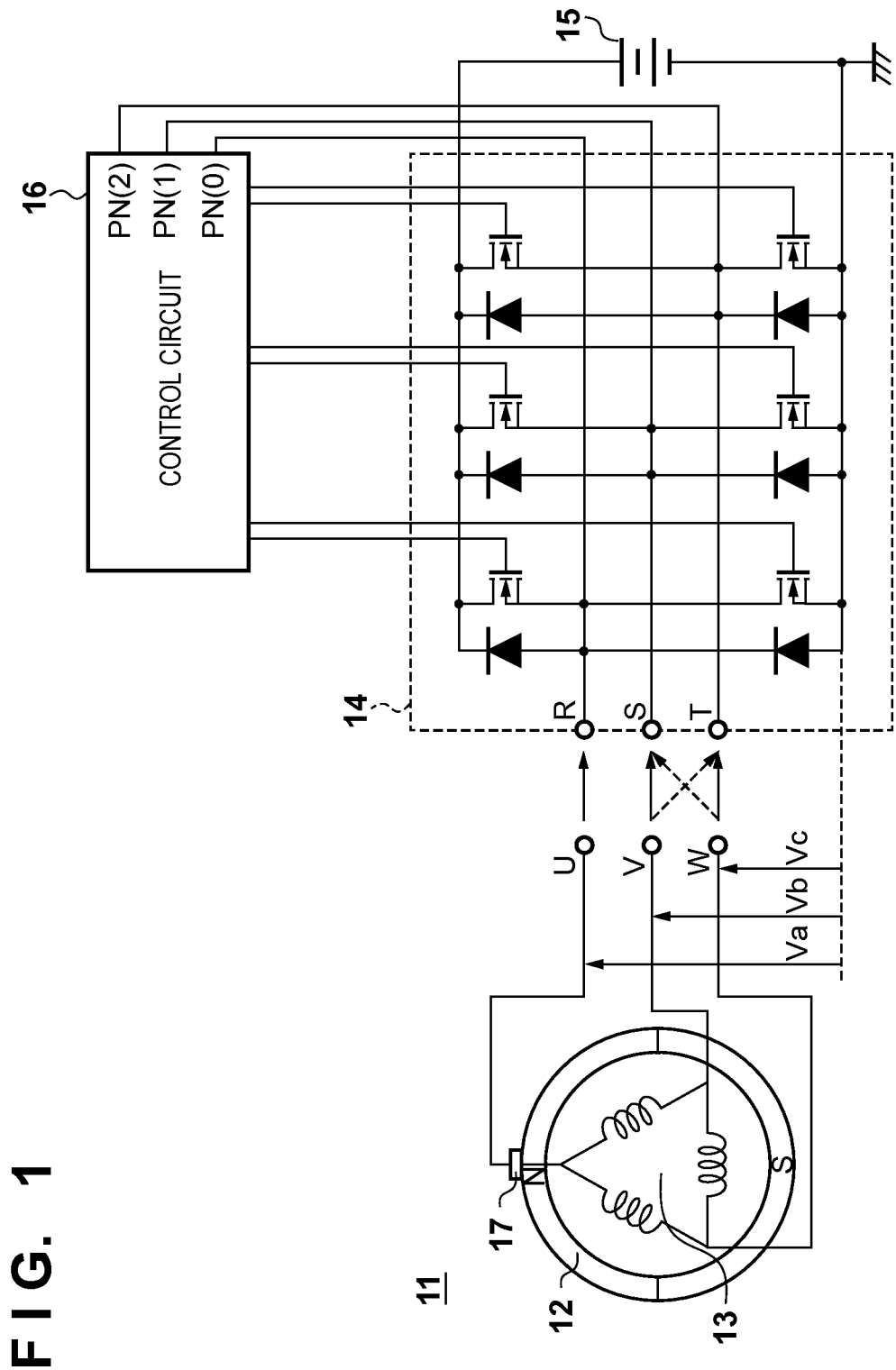
FIG. 1 is a schematic circuit diagram which shows electrical connections between a three-phase AC dynamo and battery charging apparatus when switching elements are driven to set a full-wave rectification state.

FIG. 1 is a schematic circuit diagram showing electrical connections between a three-phase AC dynamo and battery charging apparatus when switching elements are driven to set a full-wave rectification state.

A three-phase AC dynamo 11 shown in FIG. 1 is a permanent-magnet dynamo which is driven by a motor such as an internal combustion engine. The three-phase AC generator 11 includes a rotor 12 which is composed of permanent magnets attached to a yoke and forms a magnetic field, and a stator 13 including an armature's magnetic core and armature coils wound around the magnetic core. The rotor 12 is attached to a rotation shaft of the motor, and the stator 13 is fixed to an attachment portion attached to a case, cover, or the like of the motor.

Three-phase AC outputs which are output from the armature coils of the three-phase AC dynamo 11 are charged on a battery 15 as a secondary battery through a rectifying circuit 14. Note that FIG. 1 shows an example of the armature coils which are delta-connected, but the armature coils may be star-connected.

In the rectifying circuit 14, a plurality of switching elements are arranged to be parallel to rectifier elements, which can be, for example, diodes. The rectifying circuit 14 has an arrangement in which one terminal, such as a drain terminal, of the switching element is connected to a cathode terminal of each rectifier element, and the other terminal, such as a source terminal, of the switching element is connected to an anode terminal of that rectifier element. When a metal-oxide-semiconductor field-effect transistor (MOSFET) is used as the switching element, a parasitic diode which exists in a source-drain path can be used as a rectifier element. Also, as a switch, an insulated gate bipolar transistor (IGBT) can also be used. In this case, a collector of the IGBT is connected to the cathode of the rectifier element, and an emitter of the IGBT is connected to the anode of the rectifier element.

A control circuit 16 drives the respective switching elements to apply control voltages to the armature coils, thereby controlling output voltages of the three-phase AC generator 11, so as to obtain an appropriate voltage as charging a voltage of the battery 15. In order to control the output voltages, a combination of three-phase AC output terminals U, V, and W of the three-phase AC dynamo 11 and a plurality of input terminals R, S, and T of the rectifying circuit 14 has to be specified. Note that symbols U, V, and W are given to the output terminals, and symbols R, S, and T are given to the input terminals for the sake of simplicity. However, in an actual circuit, colors or prints which allow to identify these terminals are not given.

Combination patterns of connections will be described below. For example, when the output terminal U and input terminal R are connected, as shown in FIG. 1, combinations of remaining connections can include two patterns, that is, V-S and W-T connections, and V-T and W-S connections. Although not shown, in a U-S connection state, combinations of remaining connections can include two patterns, that is, V-T and W-R connections, and V-R and W-T connections. Likewise, in a U-T connection state, combinations of remaining connections can include two patterns, that is, V-R and W-S connections, and V-S and W-R connections. That is, there are a total of six patterns for connections between the output terminals of the three-phase AC dynamo 11 and the input terminals of the rectifying circuit 14.

According to embodiments of the present invention, as will be described later, connection patterns between the output terminals and input terminals can be specified.

Figure 2:
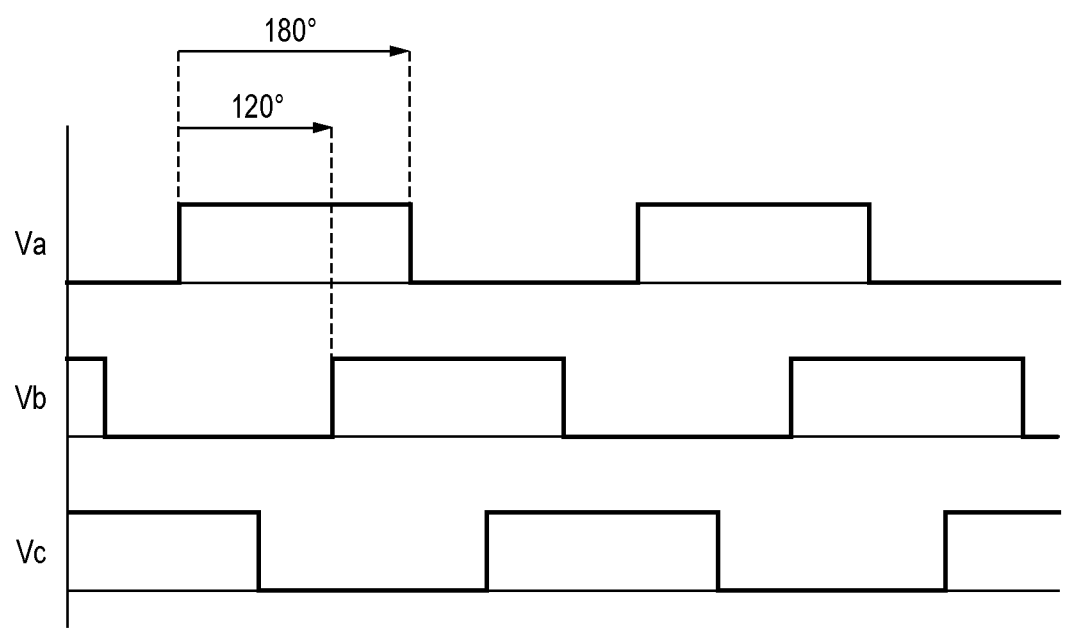
FIG. 2 is a schematic chart which shows waveforms of line voltages when a rectifying circuit is in a full-wave rectification state.

FIG. 2 schematically shows waveforms of potential differences (to be referred to as "line voltages" hereinafter) Va, Vb, and Vc between the ground potential of the battery 15 and potentials of the output terminals U, V, and W when the rectifying circuit 14 is in a full-wave rectification state. The waveforms of these line voltages repeat between nearly a positive terminal voltage of the battery 15 and nearly the ground potential at 180° intervals, and the waveforms of these line voltages have phase shifts of 120° from each other. The control circuit 16 inputs the waveforms of the line voltages Va, Vb, and Vc as signals PN(0), PN(1), and PN(2), and specifies the phases of the three-phase AC outputs connected to the terminals R, S, and T from these signals.

FIG. 3 is a block diagram showing an arrangement example of the battery charging apparatus of an embodiment of the invention.

The three-phase AC dynamo 11 is driven by an engine (motor) 10, and a reluctor 17 is fixed to its rotor. A pulse signal generator 18 is fixed to the attachment portion of the three-phase AC dynamo 11 to oppose the reluctor 17, and generates a pulse signal Tp indicating detection of the reluctor 17 every time the reluctor 17, which rotates together with the rotor, passes the vicinity of the generator 18.

The armature coils which configure the stator of the three-phase AC dynamo 11 are electrically connected to the output terminals U, V, and W. The rectifying circuit 14 is electrically connected to the output terminals U, V, and W of the three-phase AC dynamo 11. Note that the rectifying circuit 14 has an inverter type circuit (to be referred to as an "inverter circuit" hereinafter) as a combination of a plurality of switching elements, as shown in FIG. 1.

The control circuit 16 includes, for example, a one-chip microcomputer, which will be referred to as a "CPU" hereinafter, and implements various kinds of control when the CPU executes programs stored in a ROM. An inverter controller 161 inputs the pulse signal Tp, the waveforms of line voltages detected by a line voltage sensor A 162 and line voltage sensor B 163, and a voltage of the battery 15 detected by a battery voltage sensor 164. Then, the inverter controller 161 executes switching element control for driving the respective switching elements of the inverter circuit 14 based on the input pulse signal Tp, the input waveform patterns of the line voltages, and the input battery voltage. Note that the source-drain path of each switching element is set in continuity (ON state, energization state) upon driving by the inverter controller 161.

The line voltage sensor A 162 and line voltage sensor B 163 detect potential differences between potentials (line voltages) of at least two input terminals of the plurality of input terminals R, S, and T and the ground potential of the battery 15. For example, the line voltage sensor A 162 generates a signal indicating the waveform of the line voltage of the terminal R as PN(0), and the line voltage sensor B 163 generates a signal indicating the waveform of the line voltage of the terminal S as PN(1). Of course, the control circuit 16 may include a line voltage sensor C, which generates a signal indicating the waveform of the line voltage of the terminal T as PN(2), and may use that signal to specify the phases of the three-phase AC outputs connected to the input terminals R, S, and T.

The specifying method of the phases of the three-phase AC outputs connected to the plurality of input terminals of the battery charging apparatus for a vehicle according to the embodiment of the present invention will be described in detail below.

A method of inputting the line voltages Va and Vb of the three-phase AC outputs as the signals PN(0) and PN(1), as shown in FIG. 3, and specifying the phases of the three-phase AC outputs connected to the input terminals R, S, and T will be described below as the first embodiment.

Figure 4:
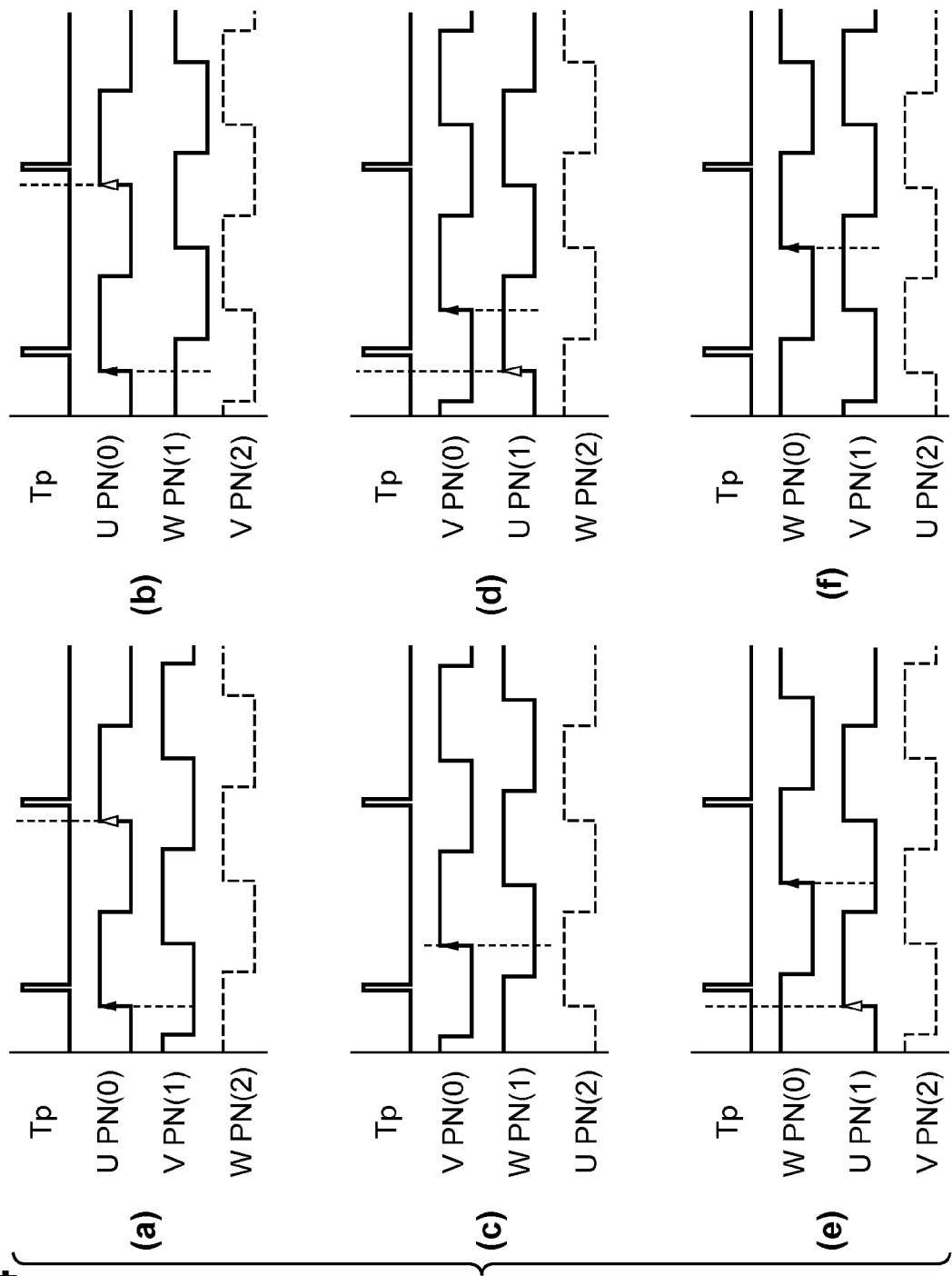
FIGS. 4a-4f illustrate charts which show relation examples between connection patterns of output terminals, input terminals, and respective signals in the full-wave rectification state.

Immediately after the power supply of the control circuit 16 is turned on, and the engine 10 is started, the inverter controller 161 does not drive all of the plurality of switching elements to set the rectifying circuit 14 in a full-wave rectification state. FIG. 4 shows examples of the relationship between connection patterns of the output terminals and input terminals and respective signals in the full-wave rectification state. Note that the signal PN(2) is not generated, but it is described by a broken line in FIG. 4.

FIG. 4 corresponds to the aforementioned six connection patterns between the output terminals of the three-phase AC dynamo 11 and the input terminals of the rectifying circuit 14:

FIG. 4(a) corresponds to U-R, V-S, and W-T connections;
FIG. 4(b) corresponds to U-R, W-S, and V-T connections;
FIG. 4(c) corresponds to V-R, W-S, and U-T connections;
FIG. 4(d) corresponds to V-R, U-S, and W-T connections;

FIG. 4(e) corresponds to W-R, U-S, and V-T connections; and FIG. 4(f) corresponds to W-R, V-S, and U-T connections.

FIG. 4 shows the pulse signal Tp generated by the pulse signal generator 18. A generation timing t of the pulse signal Tp is set under conditions that the signal Tp is generated after a line voltage of a certain phase rises, and a polarity of another line voltage does not change between the rise timing of that phase and the generation timing t of the pulse signal Tp. For example, assuming that the pulse signal Tp is generated after the U-phase rises, and the rise timing of the line voltage Va of the U-phase is 0°, the attached position of the reluctor 17 or that of the pulse generator 18 is adjusted so that the generation timing t of the pulse signal Tp satisfies 0°<t<+60°.

Figure 5:
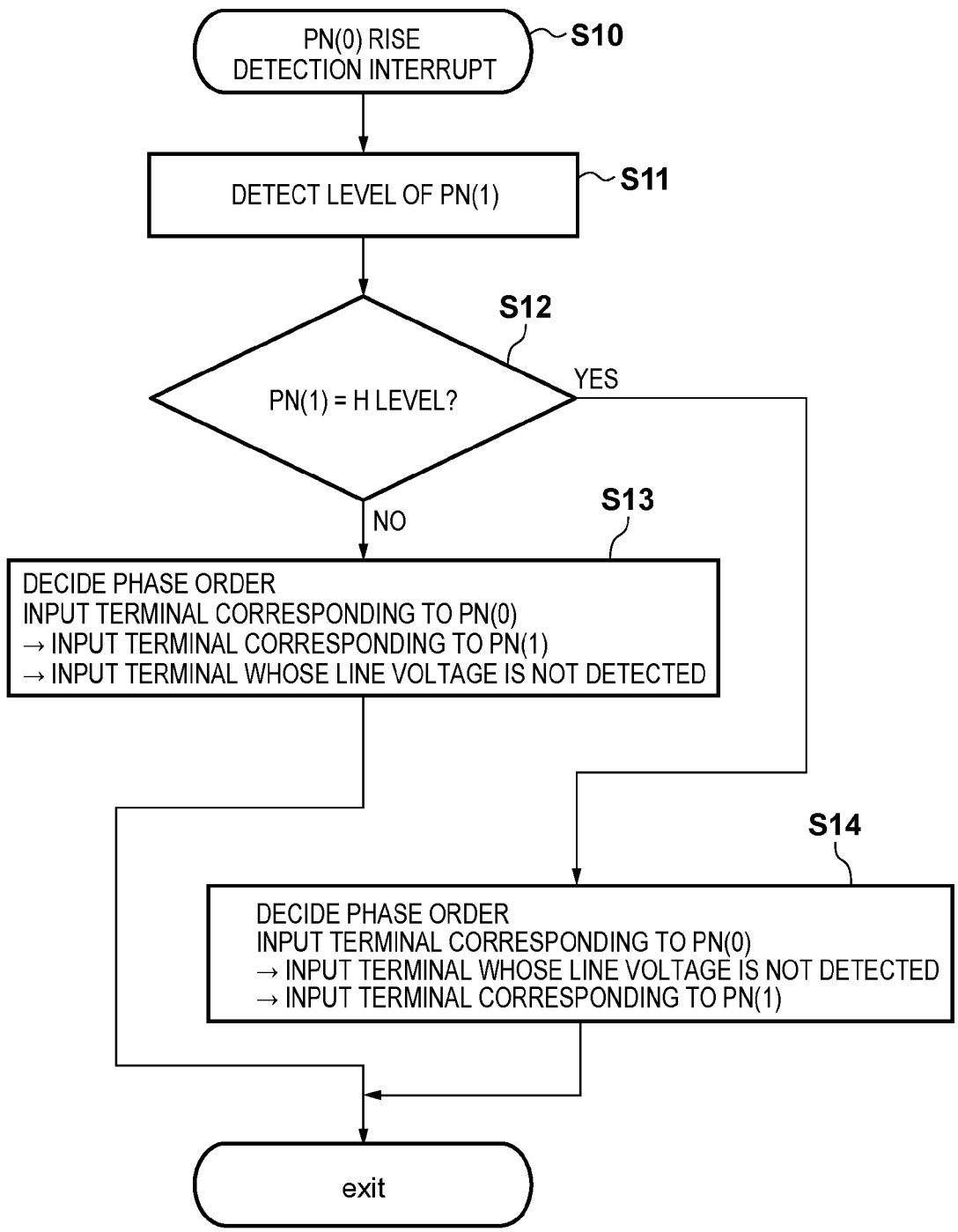
FIG. 5 is a flowchart which shows determination, which is executed by an inverter controller of the first embodiment, to determine a phase order of signals PN(0) to PN(2).

FIG. 5 is a flowchart which is executed by the inverter controller 161 of the first embodiment to determine the phase order of the signals PN(0) to PN(2). The inverter controller 161 always detects the rise timing of the signal PN(0) (S10). Then, the inverter controller 161 detects a level of the signal PN(1) at the rise timing of the signal PN(0) (S11), and determines the phase order of the three-phase AC outputs connected to the input terminals by checking whether the signal PN(1) is at high level (to be referred to as "H level" hereinafter) or low level (to be referred to as "L level" hereinafter) (S12).

For example, if the signal PN(1) is at L level (S12) at the rise timing of the signal PN(0) (S10), the phase order is an order of [input terminal corresponding to PN(0)⇒ input terminal corresponding to PN(1)⇒ input terminal whose line voltage is not detected] (to be referred to as an "R-S-T order" hereinafter) (S13). Therefore, a combination of the signals PN(0), PN(1), and PN(2) and the phases U, V, and W is one of the patterns shown in FIGS. 4(a), 4(c), and 4(e).

On the other hand, if the signal PN(1) is at H level (S12) at the rise timing of the signal PN(0) (S10), the phase order is an order of [input terminal corresponding to PN(0)⇒ input terminal whose line voltage is not detected⇒ input terminal corresponding to PN(1)] (to be referred to as an "R-T-S order" hereinafter) (S14). Therefore, a combination of the signals PN(0), PN(1), and PN(2) and the phases U, V, and W is one of the patterns shown in FIGS. 4(b), 4(d), and 4(f).

In this case, since the phase order can be determined, if which of the input terminals corresponding to the signals PN(0) to PN(2) is the U-phase, V-phase, or W-phase can be specified, the phases of all the input terminals can be specified based on the determined phase order.

Figure 6:
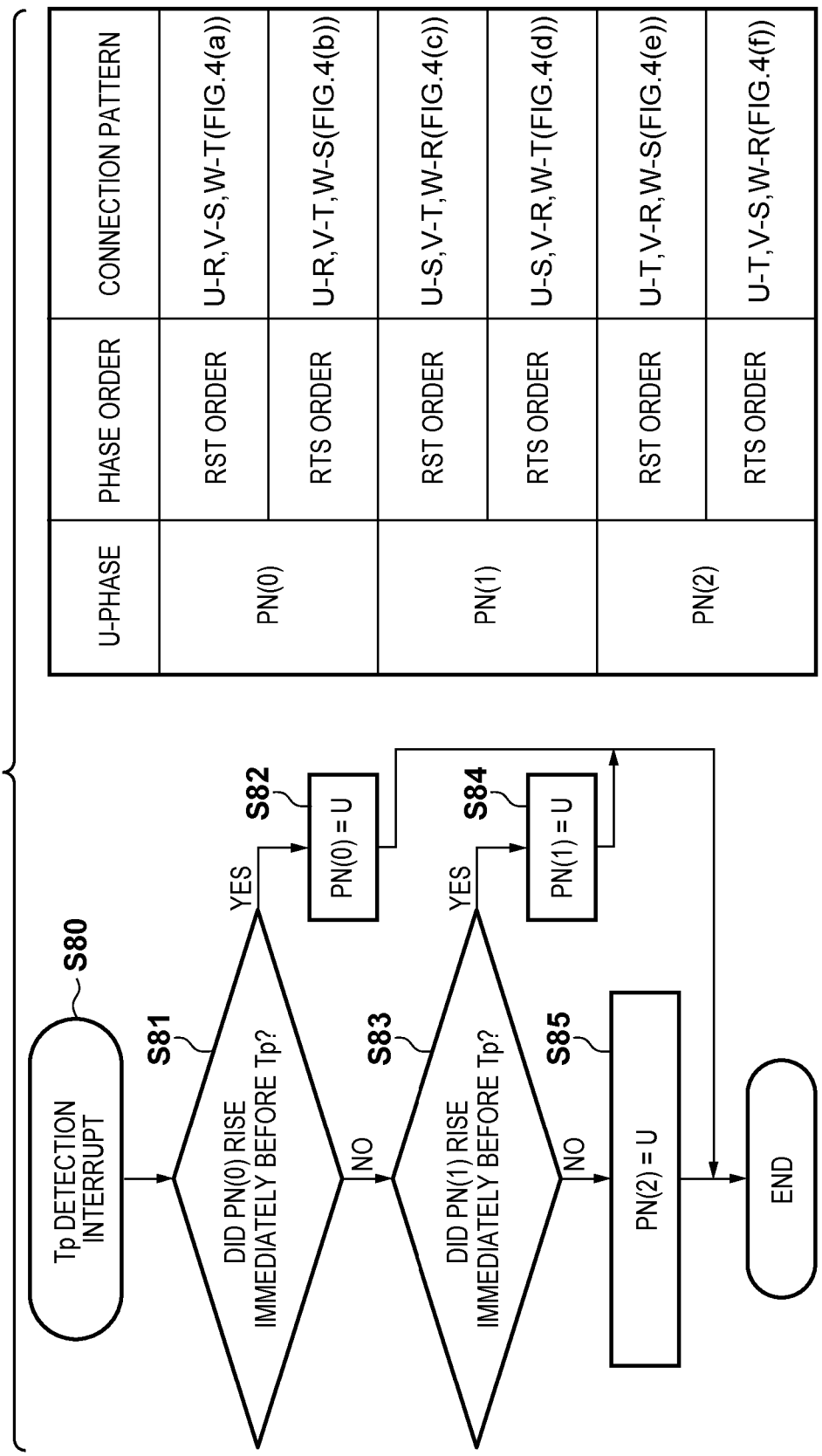
FIG. 6 is a flowchart which shows determination, which is executed by the inverter controller of the first embodiment, to specify a phase, and a table shows the relationship between the phase orders and connection patterns in the specification results of a U-phase.

FIG. 6(a) is a flowchart which is executed by the inverter controller 161 of the first embodiment to specify the phase. Note that an example will be explained below wherein the U-phase is specified. The inverter controller 161 always detects generation of the pulse signal Tp (S80).

As described above, assuming that the generation timing t of the pulse signal Tp with respect to the rise timing=0° of the U-phase is set to meet 0°<t<+60°, it can be specified that the input terminal corresponding to a signal which rose immediately before generation of the pulse signal Tp is connected to the U-phase. That is, if the signal PN(0) rises immediately before generation of the pulse signal Tp (S81), it is determined that the input terminal corresponding to the signal PN(0) is the U-phase (S82). In case of the patterns shown in FIGS. 4(a) and 4(b), it is determined that the input terminal corresponding to the signal PN(0) is the U-phase.

If the signal PN(1) rises immediately before generation of the pulse signal Tp (S83), it is determined that the input terminal corresponding to the signal PN(1) is the U-phase (S84). In case of the patterns shown in FIGS. 4(d) and 4(e), it is determined that the input terminal corresponding to the signal PN(1) is the U-phase.

If the U-phase is not connected to the input terminal corresponding to the signal PN(0) or PN(1), no signal rises immediately before generation of the pulse signal Tp. For example, in the pattern shown in FIG. 4(f), since the signal PN(0) rises before generation of the pulse signal Tp, and the signal PN(1) then falls, it is determined in this case that no signal rose immediately before generation of the pulse signal Tp. Therefore, in this case, the third input terminal except for those corresponding to the signals PN(0) and PN(1) is the U-phase (S85), and when the signal PN(2) is generated, the input terminal corresponding to the signal PN(2) is the U-phase. That is, in case of the patterns shown in FIGS. 4(c) and 4(f), it is determined that the input terminal corresponding to the signal PN(2) is the U-phase.

FIG. 6(b) shows the relationship among the U-phase specification results, phase orders, and connection patterns. When it is specified that the input terminal corresponding to the signal PN(0) is the U-phase, if the determination result of the phase order is an R-S-T order, the connection pattern of U-R, V-S, and W-T (FIG. 4(a)) is specified; if the determination result of the phase order is an R-T-S order, the connection pattern of U-R, V-T, and W-S (FIG. 4(b)) is specified.

On the other hand, when it is specified that the input terminal corresponding to the signal PN(1) is the U-phase, if the determination result of the phase order is an R-S-T order, the connection pattern of U-S, V-T, and W-R (FIG. 4(e)) is specified; if the determination result of the phase order is an R-T-S order, the connection pattern of U-S, V-R, and W-T (FIG. 4(d)) is specified.

Also, when it is specified that the input terminal corresponding to the signal PN(2) is the U-phase, if the determination result of the phase order is an R-S-T order, the connection pattern of U-T, V-R, and W-S (FIG. 4(c)) is specified; if the determination result of the phase order is an R-T-S order, the connection pattern of U-T, V-S, and W-R (FIG. 4(f)) is specified.

Upon completion of the aforementioned processing, the inverter controller 161 stores the specification results of the phases of the three-phase AC outputs connected to the plurality of input terminals R, S, and T in a memory area of itself, and starts driving of the switching elements to release the full-wave rectification state. The specification results stored in the memory area are maintained until the power supply of the control circuit 16 is turned off. The inverter controller 161 skips the aforementioned processing when the phases are specified.

In the above description, the example in which the phase order is determined based on the rise timing of the signal PN(0) has been explained. However, the phase order determination processing may be started in response to the fall timing of the signal PN(0). In this case, if the signal PN(1) is at H level, the R-S-T order is determined; if the signal PN(1) is at L level, the R-T-S order is determined.

In the above description, the specification example of the U-phase has been explained while setting the generation timing t of the pulse signal Tp to meet 0°<t<+60° in correspondence with the rise timing of the U-phase. However, the phases may be specified by adjusting the generation timing t of the pulse signal Tp to the rise timing of another phase.

In the above description, the specification example of the input terminal connected to the U-phase based on the signal which rises before generation of the pulse signal Tp has been explained. However, the input terminal connected to the W-phase may be specified based on a signal which falls immediately after generation of the pulse signal Tp.

A method of specifying the phases of the three-phase AC outputs connected to the input terminals R, S, and T according to a second embodiment of the present invention will be described below. Note that the same reference numerals in the second embodiment denote nearly the same components as in the first embodiment, and a detailed description thereof will not be repeated.

Figure 7:
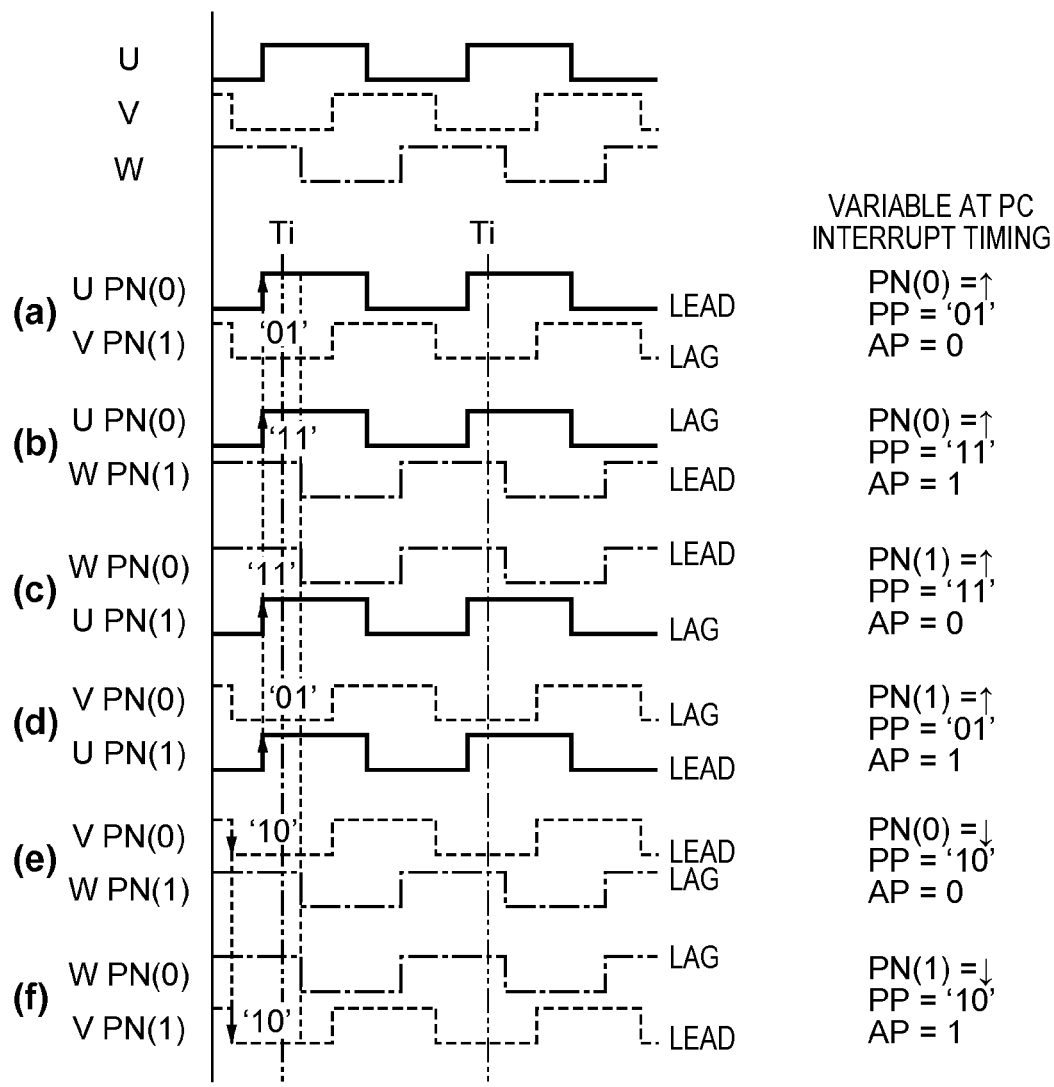
FIGS. 7a-7g show waveform patterns of signals PN(0) and PN(1) in the full-wave rectification state.

FIG. 7 shows waveform patterns of signals PN(0) and PN(1) in a full-wave rectification state. That is, FIG. 7 corresponds to the aforementioned six connection patterns between the output terminals of the three-phase AC dynamo 11 and the input terminals of the rectifying circuit 14. For example, assuming that the input terminal corresponding to the signal PN(0) is the R-terminal and that corresponding to the signal PN(1) is the S-terminal, FIG. 7(a) shows the waveform patterns in case of the connection pattern of U-R, V-S, and W-T; FIG. 7(b) shows those in case of the connection pattern of U-R, W-S, and V-T; FIG. 7(c) shows those in case of the connection pattern of W-R, U-S, and V-T; FIG. 7(d) shows those in case of the connection pattern of V-R, U-S, and W-T; FIG. 7(e) shows those in case of the connection pattern of V-R, W-S, and U-T; and FIG. 7(f) shows those in case of the connection pattern of W-R, V-S, and U-T. Also, "lead" on the right side of each waveform indicates a waveform, the phase of which relatively leads, and "lag" indicates a waveform, the phase of which relatively lags.

That is, according to the connection patterns between the output terminals of the three-phase AC dynamo 11 and the input terminals of the rectifying circuit 14, the inverter controller 161 inputs any of the six waveform patterns shown in FIG. 7 from the line voltage sensor A 162 and line voltage sensor B 163.

Figure 8:
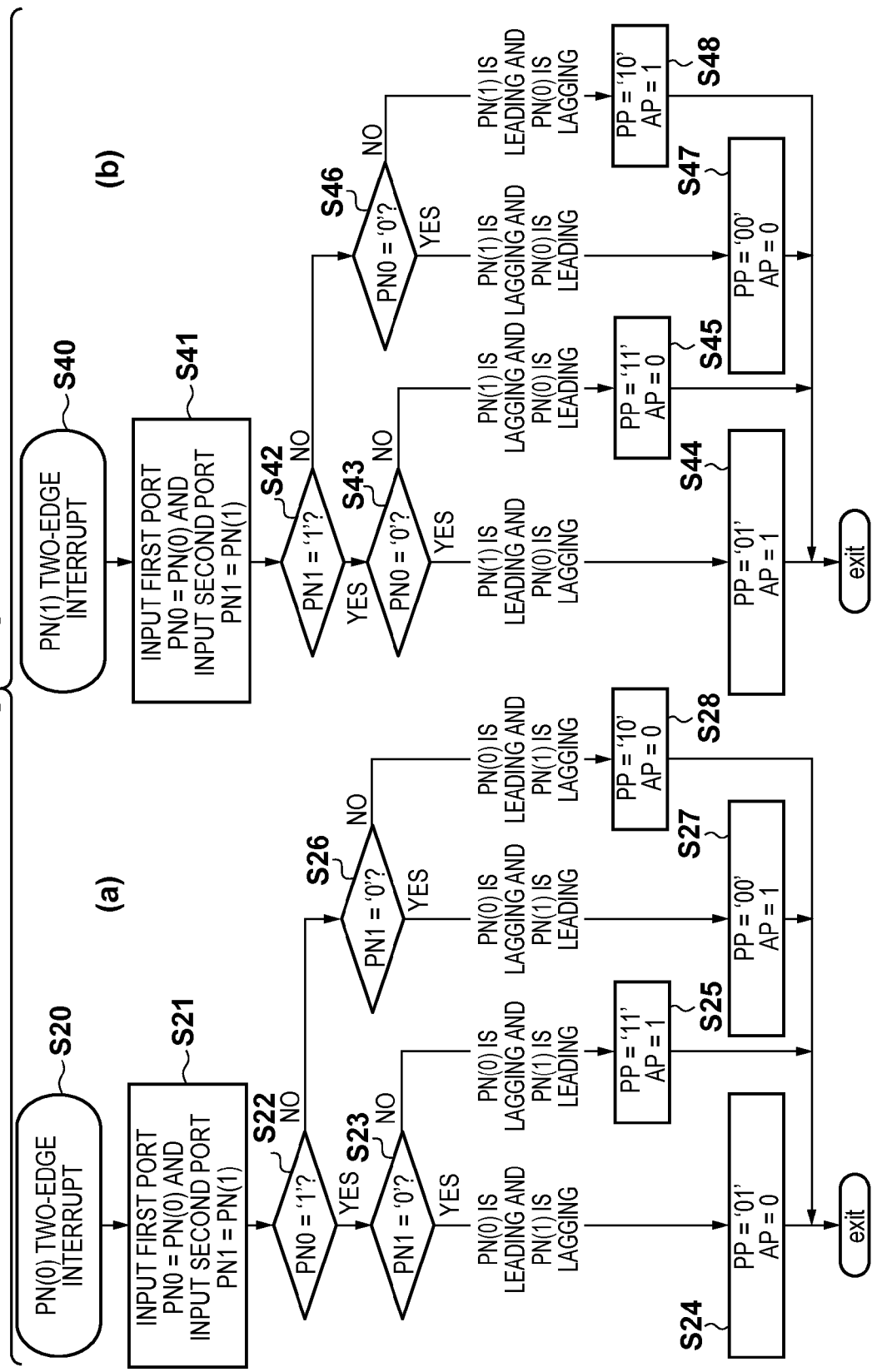
FIGS. 8a and 8b are flowcharts which explain two-edge interrupt processing executed by an inverter controller of the second embodiment.

The inverter controller 161 executes interrupt processing (to be referred to as "two-edge interrupt processing" hereinafter) at rising and falling edges of a voltage of the signal PN(0) and at rising and falling edges of a voltage of the signal PN(1). FIG. 8 shows flowcharts for explaining the two-edge interrupt processing executed by the inverter controller 161 of the second embodiment.

FIG. 8(a) shows the interrupt processing upon detection of the edges of the signal PN(0). The inverter controller 161 always detects the edges of the signal PN(0) (S20). Then, upon detection of the edges of the signal PN(0), the inverter controller 161 inputs a level of the signal PN(0) of a first port to set it in a variable PN0, and inputs a level of the signal PN(1) of a second port to set it in a variable PN1 (S21). Note that in the following description, H level is expressed by "1" as a binary value, and L level is expressed by "0" as a binary value. For example, when the signal PN(0) is at H level, PN0="1".

Next, the inverter controller 161 determines whether or not PN0="1" (S22), and also determines whether or not PN1="0" (S23, S26). If PN0="1" and PN0="0" (FIG. 7(a)), the inverter controller 161 determines that PN(0) is leading and PN(1) is lagging, sets 0 in a variable AP indicating a leading port, sets the value (PN1) of the second port in an upper bit of a 2-bit variable PP which expresses a port pattern, and sets the value (PN0) of the first port in a lower bit (S24). In this case, since PN1="0" and PN0="1", PP="01". On the other hand, if PN0="1" and PN1="1" (FIG. 7(b)), the inverter controller 161 determines that PN(0) is lagging and PN(1) is leading, and sets the variables AP=1 and PP="11" (S25).

On the other hand, if PN0="0" and PN1="0" (which do not exist in practice), the inverter controller 161 determines that PN(0) is lagging and PN(1) is leading, and sets AP=1 and PP="00" (S27). Also, if PN0="0" and PN1="1" (FIG. 7(e)), the inverter controller 161 determines that PN(0) is leading and PN(1) is lagging, and sets AP=0 and PP="10" (S28).

FIG. 8(b) shows the interrupt processing upon detection of the edges of the signal PN(1). The inverter controller 161 always detects the edges of the signal PN(1) (S40). Then, upon detection of the edges of the signal PN(1), the inverter controller 161 reads a level of the signal PN(0) of the second port to set it in the variable PN0, and inputs a level of the signal PN(1) of the first port to set it in the variable PN1 (S41).

Next, the inverter controller 161 determines whether or not PN1="1" (S42), and also determines whether or not PN0="0" (S43, S46). If PN1="1" and PN1="0" (FIG. 7(d)), the inverter controller 161 determines that PN(1) is leading and PN(0) is lagging, sets AP=1, sets the value (PN0) of the second port in an upper bit of the variable PP, and sets the value (PN1) of the first port in a lower bit (S44). In this case, since PN1="1" and PN0="0", PP="01". On the other hand, if PN1="1" and PN1="1" (FIG. 7(c)), the inverter controller 161 determines that PN(1) is lagging and PN(0) is leading, and sets the variables AP=0 and PP="11" (S45).

On the other hand, if PN1="0" and PN0="0" (which do not exist in practice), the inverter controller 161 determines that PN(1) is lagging and PN(0) is leading, and sets AP=0 and PP="00" (S47). Also, if PN1="0" and PN0="1" (FIG. 7(f)), the inverter controller 161 determines that PN(1) is leading and PN(0) is lagging, and sets AP=1 and PP="10" (S48).

When the variable PP which expresses the port pattern is set, as described above, it assumes three different values "01", "11", and "10", and PP="00" is normally not generated. Then, at the generation timing t of the pulse signal Tp described in the first embodiment, when the value of the variable P and the relationship between "leading port" and "lagging port" expressed by the variable AP at that timing are determined, the phases of the three-phase AC outputs connected to the input terminals can be specified. A timing Ti indicated by a two-dot chain line in FIG. 7 indicates that of a PC interrupt upon generation of the pulse signal Tp. That is, assuming that the rise timing of the U-phase is 0°, the relationship among the values of the variable PP obtained by a PC interrupt upon generation of a pulse signal in the range of 0°<t<+60°, "leading port", "lagging port", and "remaining port", and the phases of the three-phase AC outputs is as shown in FIG. 7(g).

Figure 9:
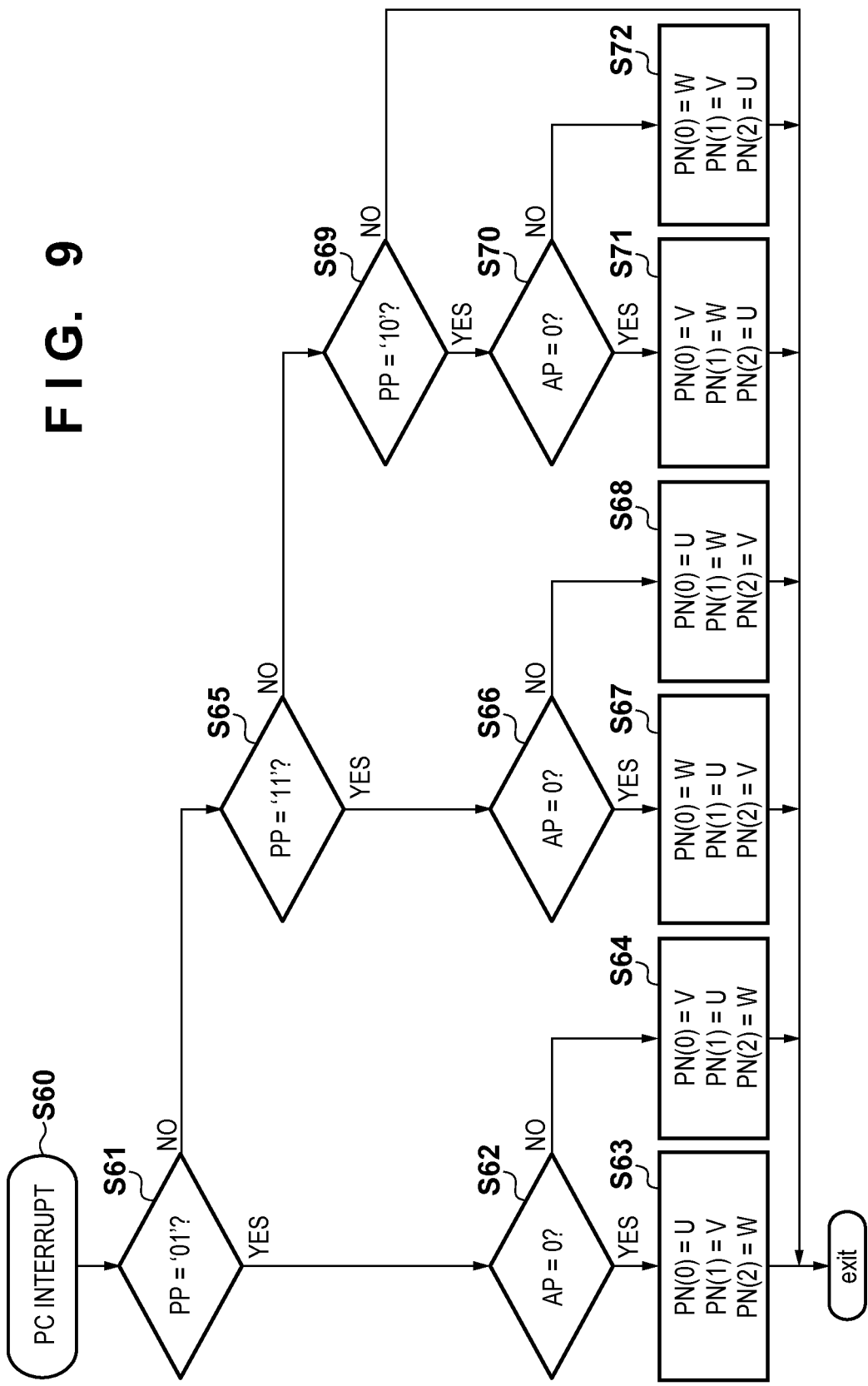
FIG. 9 is a flowchart which shows decision, which is executed by the inverter controller of the second embodiment, to decide a connection pattern by a PC interrupt.

FIG. 9 is a flowchart which is executed by the inverter controller 161 of the second embodiment to decide the connection pattern by a PC interrupt. The inverter controller 161 always detects generation of the pulse signal Tp (S60). Then, upon detection of generation of the pulse signal Tp, the inverter controller 161 determines whether or not the variable PP (which expresses the port pattern)="01" (S61). If PP="01", the inverter controller 16 determines whether or not the variable AP (which expresses the leading port)=0 (S62). Then, if AP=0, the inverter controller 161 specifies that the input terminal (for example, R-terminal) corresponding to the signal PN(0) as the leading port is the U-phase, the input terminal (for example, S-terminal) corresponding to the signal PN(1) as the lagging port is the V-phase, and the input terminal (for example, T-terminal) as the remaining port is the W-phase (S63). On the other hand, if AP=1, the inverter controller 161 specifies that the R-terminal corresponding to the signal PN(0) as the lagging port is the V-phase, the S-terminal corresponding to the signal PN(1) as the leading port is the U-phase, and the T-terminal as the remaining port is the W-phase (S64).

If PP≠"01", the inverter controller 16 determines whether or not PP="11" (S65). If PP="11", the inverter controller 16 determines whether or not AP=0 (S66). If AP=0, the inverter controller 161 specifies that the R-terminal corresponding to the signal PN(0) as the leading port is the W-phase, the S-terminal corresponding to the signal PN(1) as the lagging port is the U-phase, and the T-terminal as the remaining port is the V-phase (S67). On the other hand, if AP=1, the inverter controller 161 specifies that the R-terminal corresponding to the signal PN(0) as the lagging port is the U-phase, the S-terminal corresponding to the signal PN(1) as the leading port is the W-phase, and the T terminal as the remaining port is the V-phase (S68).

If PP≠"11", the inverter controller 16 determines whether or not PP="10" (S69). If PP="10", the inverter controller 16 determines whether or not AP=0 (S70). If AP=0, the inverter controller 161 specifies that the R-terminal corresponding to the signal PN(0) as the leading port is the V-phase, the S-terminal corresponding to the signal PN(1) as the lagging port is the W-phase, and the T-terminal as the remaining port is the U-phase (S71). On the other hand, if AP=1, the inverter controller 161 specifies that the R-terminal corresponding to the signal PN(0) as the lagging port is the W-phase, the S-terminal corresponding to the signal PN(1) as the leading port is the V-phase, and the T-terminal as the remaining port is the U-phase (S72).

Also, PP="00" is a value which is not generated normally. Therefore, if PP="00", the inverter controller 161 does not specify the connection pattern, and ends the PC interrupt.

Upon completion of the aforementioned processing, the inverter controller 161 stores the specification results of the phases of the three-phase AC outputs connected to the plurality of input terminals R, S, and T in a memory area of itself, and starts driving of the switching elements to release the full-wave rectification state. The specification results stored in the memory area are maintained until the power supply of the control circuit 16 is turned off. The inverter controller 161 skips the aforementioned processing when the phases are specified.

Note that the aforementioned two-edge interrupt and PC interrupt are executed after the rotation of the three-phase AC dynamo 11 becomes stable, that is, these interrupts are started after the waveforms of the respective ports wrap or the processes are reset when the rising and falling edges of each port are not alternately observed.

The first and second embodiments have exemplified the case in which the connection pattern is specified in the full-wave rectification state. In this case, the connection pattern specification processing is executed within a short period of time after the engine 10 is started. On the other hand, as a method of extracting waveforms of the phase voltages Va and Vb, a method of setting an all-phase short-circuited state in which a part of the switching elements are driven during the connection pattern specification processing is available.

Figure 10:
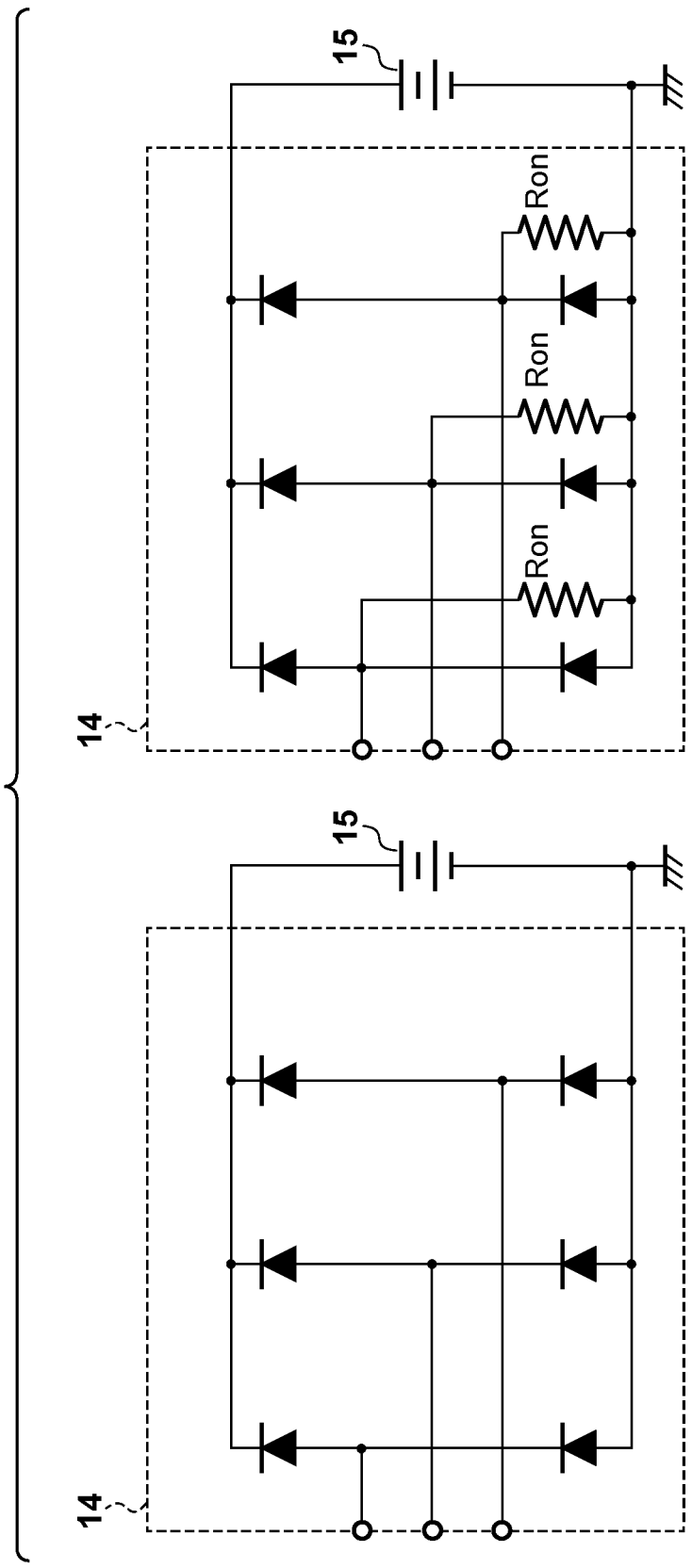
FIGS. 10a and 10b show a full-wave rectification state and all-phase short-circuited state, respectively, of rectifiers.

FIG. 10(*a*) shows the full-wave rectification state of the rectifying circuit 14, and FIG. 10(*b*) shows the all-phase short-circuited state of the rectifying circuit 14. The switching elements to be driven in the all-phase short-circuited state are three switching elements whose source terminal is connected to the ground potential, as shown in FIG. 1. When the switching elements are FETs, voltages obtained by multiplying an ON resistance Ron of the source-drain path and current values of the respective phases are input to the line voltage sensor A 162 and line voltage sensor B 163, thus allowing the phase order determination processing and phase decision processing. The connection pattern decision processing in the all-phase short-circuited state is executed within a short period of time after the engine 11 is started.

We claim:

1. A battery charging apparatus, comprising:
   a plurality of input terminals configured to be respectively connected to output terminals of respective phases of a three-phase AC dynamo;
   a rectifying circuit comprising a plurality of rectifying elements and a plurality of switching elements;
   a switching element control unit configured to control turning on/off respective switching elements of the rectifying circuit; and
   a pulse generation unit configured to generate a pulse signal by detecting passage of a reluctor disposed on a rotor of the three-phase AC dynamo,
   wherein the switching element control unit is configured to control the plurality of switching elements to set output voltages to a battery in a full-wave rectification state or an all-phase short-circuited state, and
   wherein the switching element control unit comprises:
      a potential difference detection unit configured to simultaneously detect potential differences between potentials of at least two input terminals of the plurality of input terminals and a ground potential of the battery, and configured to generate signals indicating the detected potential differences; and
      a specifying unit configured to determine a combination pattern of phases of the three-phase AC outputs input to the input terminals and the signals generated by the potential difference detection unit, and specifying a phase of the three-phase AC outputs input to the plurality of input terminals calculated from a relationship among the combination pattern, a generation timing of the pulse signal, and rise timings of the signals.

2. The battery charging apparatus according to claim 1, wherein the specifying unit is configured to control, using the switching element control unit, the plurality of switching elements to set the three-phase AC outputs input to the plurality of input terminals in the full-wave rectification state in determination of the combination pattern and specification of the phase.

3. The battery charging apparatus according to claim 1, wherein the specifying unit is configured to control, using the switching element control unit, the plurality of switching elements to set the three-phase AC outputs input to the plurality of input terminals in the all-phase short-circuited state in determination of the combination pattern and specification of the phase.

4. The battery charging apparatus according to claim 1, wherein the specifying unit is configured to determine the combination pattern based on a rise timing of the one of the signals generated by the potential difference detection unit and a level of another signal of the signals, and to specify an input terminal which inputs a predetermined phase of the three-phase AC outputs based on the rise timings of the signals immediately before generation of the pulse signal.

5. The battery charging apparatus according to claim 4, wherein, when a rise timing of the predetermined phase is defined by 0°, the generation timing of the pulse signal is larger than 0° and is less than +60°.

6. The battery charging apparatus according to claim 1, wherein the specifying unit is configured to determine the combination pattern based on a relationship between the signals generated by the potential difference detection unit at rise and fall timings of one of the signals, and to specify the phase of the three-phase AC outputs input to each of the plurality of input terminals based on a determination result of the combination pattern immediately before generation of the pulse signal.

7. The battery charging apparatus according to claim 1, wherein the switching element control unit is configured to control the turning on/off based on phases, which are specified by the specifying unit, of the three-phase AC outputs input to the plurality of input terminals.

8. The battery charging apparatus according to claim 1, wherein the potential difference detection unit comprises:
   a first detector configured to detect a potential difference between a potential of a first input terminal of the plurality of input terminals and the ground potential of the battery; and
   a second detector configured to detect a potential difference between a potential of a second input terminal of the plurality of input terminals and the ground potential of the battery.

9. A battery charging apparatus, comprising:
   input means for receiving input from a three-phase AC dynamo;
   rectifying means for rectifying a signal, said rectifying means comprising a plurality of rectifying elements and a plurality of switching elements;
   switching element control means for controlling turning on/off of respective switching elements of the rectifying means; and
   pulse generation means for generating a pulse signal by detecting passage of a reluctor disposed on a rotor of the three-phase AC dynamo,
   wherein the switching element control means controls the plurality of switching elements to set output voltages to a battery in a full-wave rectification state or an all-phase short-circuited state, and
   wherein the switching element control means comprises
      potential difference detection means for simultaneously detecting potential differences between potentials of at least two input terminals of the plurality of input terminals and a ground potential of the battery, and for generating signals indicating the detected potential differences; and
      specifying means for determining a combination pattern of phases of the three-phase AC outputs input to the input terminals and the signals generated by the potential difference detecting means, and specifying a phase the three-phase AC outputs input to each of the plurality of input terminals calculated from a relationship among the combination pattern, a generation timing of the pulse signal, and rise timings of the signals.

10. The battery charging apparatus according to claim 9, wherein the specifying means controls, using the switching element control unit, the plurality of switching elements to set the three-phase AC outputs input to the plurality of input terminals in the full-wave rectification state in determination of the combination pattern and specification of the phase.

11. The battery charging apparatus according to claim 9, wherein the specifying means controls, using the switching element control means, the plurality of switching elements to set the three-phase AC outputs input to the plurality of input terminals in the all-phase short-circuited state in determination of the combination pattern and specification of the phase.

12. The battery charging apparatus according to claim 9, wherein the specifying means determines the combination pattern based on a rise timing of one of the signals generated by the potential difference detection means and a level of another signal of the signals, and to specify an input terminal which inputs a predetermined phase of the three-phase AC outputs based on the rise timings of the signals immediately before generation of the pulse signal.

13. The battery charging apparatus according to claim 12, wherein, when a rise timing of the predetermined phase is defined by 0°, the generation timing of the pulse signal is larger than 0° and is less than +60°.

14. The battery charging apparatus according to claim 9, wherein the specifying means determines the combination pattern based on a relationship between the signals generated by the potential difference detection means at rise and fall timings of one of the signals, and to specify the phase of the three-phase AC outputs input to each of the plurality of input terminals based on a determination result of the combination pattern immediately before generation of the pulse signal.

15. The battery charging apparatus according to claim 9, wherein the switching element control means controls the turn-on/off based on phases, which are specified by the specifying means, of the three-phase AC outputs input to the plurality of input terminals.

* * * * *